(12) United States Patent
Pope et al.

(10) Patent No.: US 10,002,363 B2
(45) Date of Patent: *Jun. 19, 2018

(54) PEER-TO-PEER QUORUM SENSING

(71) Applicant: Amazon Technologies, Inc., Seattle, WA (US)

(72) Inventors: Elmore Eugene Pope, Sammamish, WA (US); Christopher L. Scofield, Seattle, WA (US); Bradley E. Marshall, Seattle, WA (US); Eric B. Merritt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 613 days.

This patent is subject to a terminal disclaimer.

(21) Appl. No.: 14/529,789

(22) Filed: Oct. 31, 2014

(65) Prior Publication Data

US 2015/0058098 A1 Feb. 26, 2015

Related U.S. Application Data

(63) Continuation of application No. 11/965,257, filed on Dec. 27, 2007, now Pat. No. 8,880,585.

(51) Int. Cl.
| | |
|---|---|
| *G06F 15/16* | (2006.01) |
| *G06Q 30/02* | (2012.01) |
| *H04L 29/08* | (2006.01) |
| *G07C 13/00* | (2006.01) |

(52) U.S. Cl.
CPC ......... *G06Q 30/0203* (2013.01); *G07C 13/00* (2013.01); *H04L 67/104* (2013.01)

(58) Field of Classification Search
CPC ............... H04L 29/08072; H04L 29/06; H04L 29/0809
USPC ........................................................ 709/203
See application file for complete search history.

(56) References Cited

U.S. PATENT DOCUMENTS

| | | | |
|---|---|---|---|
| 2002/0143855 A1 | 10/2002 | Traversat et al. | |
| 2007/0140110 A1* | 6/2007 | Kaler | H04L 67/104 370/218 |
| 2007/0271337 A1* | 11/2007 | Olson | G06Q 10/10 709/204 |
| 2009/0043887 A1 | 2/2009 | Coekaerts | |
| 2009/0084837 A1* | 4/2009 | Kalech | G07C 13/00 235/51 |

* cited by examiner

*Primary Examiner* — Alan S Chou
(74) *Attorney, Agent, or Firm* — Thomas | Horstemeyer, LLP

(57) ABSTRACT

Disclosed are embodiments configured to detect a quorum of peers in a peer to peer network. In one embodiment, a first peer receives a message originating in a second peer, where the message includes a peer identifier. The peer identifier is stored in quorum detection data in response to determining that the peer identifier is not already present in the quorum detection data. A quorum of the peers is detected based at least in part on the quorum detection data.

20 Claims, 6 Drawing Sheets

PEER-TO-PEER QUORUM SENSING

CROSS-REFERENCE TO RELATED APPLICATIONS

This application is a continuation of, and claims priority to, co-pending U.S. Patent Application entitled "PEER-TO-PEER QUORUM SENSING," filed on Dec. 27, 2007 and assigned application Ser. No. 11/965,257, which is incorporated herein by reference in its entirety.

BACKGROUND

Peer systems in peer-to-peer networks may be able to act in concert to achieve various goals. However, most peers in a peer-to-peer network only are aware of a limited number of other peers in the peer-to-peer network. Consequently, a mass of individual peers may exist but will not be able to work together as they may not know how many exist.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
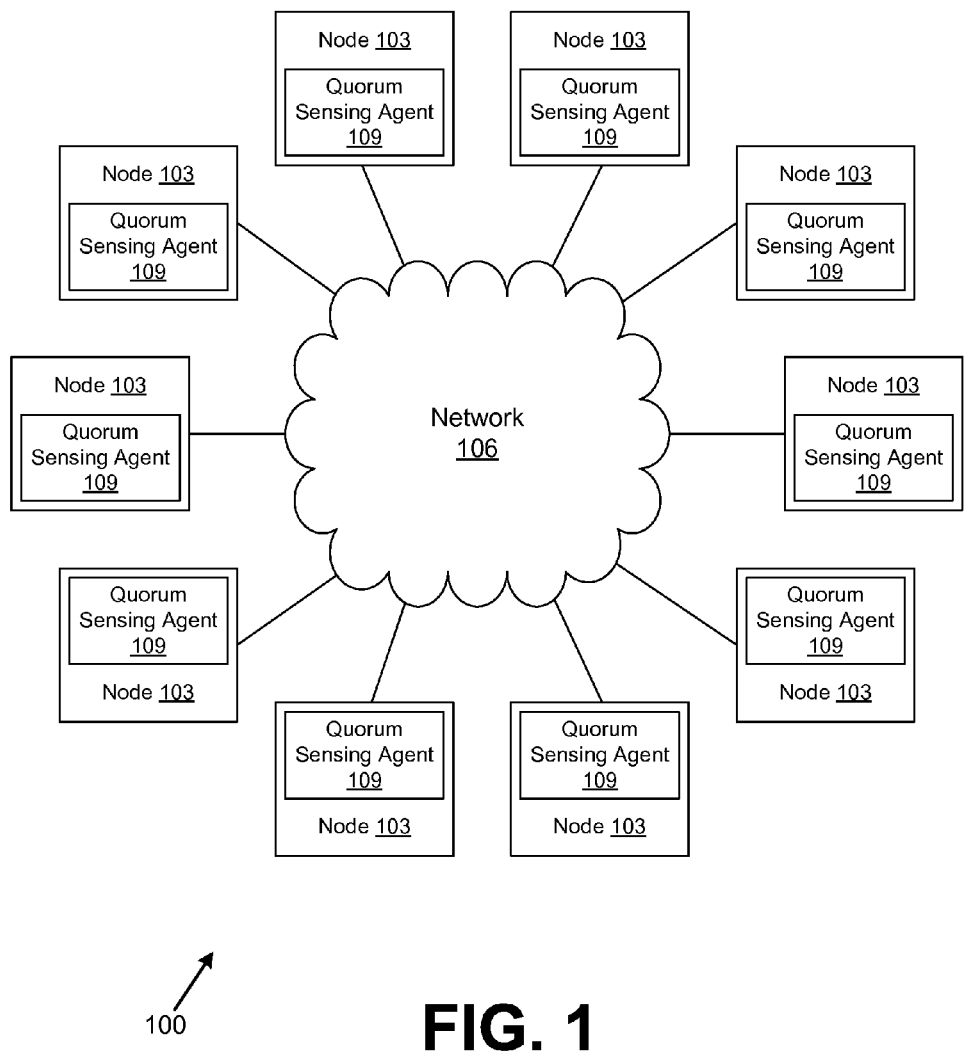
FIG. 1 is a drawing of a peer-to-peer network according to an embodiment of the present disclosure.

With reference to FIG. 1, shown is a peer-to-peer network 100 according to the various embodiments of the present disclosure. The peer-to-peer network 100 includes a plurality of nodes 103 that are coupled together via a network 106. Each of the nodes 103 comprises a peer within the peer-to-peer network 100. To this end, each of the nodes 103 may comprise, for example, a processor based system such as a computer system, a personal digital assistant, a server, or other system with like capabilities. Also, the network 106 may comprise, for example, the Internet, intranets, wide area networks (WANs), local area networks, wireless networks, or other suitable networks, etc., or any combination of two or more such networks.

Executed on each of the nodes 103 is a quorum sensing agent 109. The quorum sensing agent 109 is a peer-to-peer quorum sensing application that is implemented on the respective nodes 103 so that each of the nodes 103 can detect whether a quorum of nodes 103 exists on the peer-to-peer network 100 at a given time.

Although a limited number of nodes 103 are shown in FIG. 1 as included in the peer-to-peer network 100, there may be any number of nodes 103 in the peer-to-peer network 100. Each of the nodes 103 may have, for example, a unique address on the network 106. By virtue of the addresses, each of the nodes 103 can communicate with every one of the other nodes 103 coupled to the network 106.

To implement communication between the nodes 103, according to one embodiment, the quorum sensing agents 109 executed within each node 103 may be configured to pass messages directly to each other (i.e. peer-to-peer). In one embodiment, each node 103 is configured to maintain an indication such as an address of the other nodes 103 within the network 100 that comprise "peers" with which the quorum sensing agent 109 of a given node 103 can communicate. For example, the quorum sensing agent 109 within each node 103 may be configured to maintain the indication of the other nodes 103. The indication of the nodes 103 may be stored within a given node 103 in a table or other suitable data structure as can be appreciated.

It is typically the case that a given node 103 in the peer-to-peer network 100 only "knows" about a limited number of nodes 103. This may be the case, for example, because the limited number of nodes 103 are the only nodes 103 with which the given node 103 communicates for various purposes. As such, the given node 103 may have stored within an appropriate table or other data structure the network addresses or other identifying information of the respective nodes 103 that are peers to such node 103. As such, each node 103 may generate and send messages only to the nodes 103 that are its peers which are the nodes 103 of which it is aware based upon having identifying information for such peer nodes 103.

The address information or other identifying information of respective nodes 103 that is maintained in a given node 103 may be entered into a respective node 103 over time by a user. Alternatively, the addresses or other indication of peer nodes 103 may be discovered based upon communication of a given node 103 with other devices on the network 100. Still further, various applications may be implemented in the nodes 103 that facilitate discovery of other nodes 103 on the peer-to-peer network 100.

It is noted that in the peer-to-peer network 100, the relationships among various nodes 103 within the network 100 do not necessarily bear a correspondence to physical relationships that may exist among various ones of the nodes 103. That is to say, the nodes 103 are configured as "logical peers" within the network 100 and are logically proximate within the network 100, but may be either physically close or physically distant.

Nodes 103 that are configured as peers with respect to each other may directly exchange messages with one another without such messages passing through other nodes 103 on the network 100. Alternatively, messages between respective nodes 103 may actually pass through other ones of the nodes 103 that act as intermediate devices between respective pairs of nodes 103. Communications between respective nodes 103 may be implemented by various physical layer systems and may exhibit varying degrees of latency and bandwidth based upon the underlying physical network and physical protocols that may be employed. In this respect, protocols employed between nodes 103 may comprise, for example, the Internet Protocol (IP) or other appropriate protocols as can be appreciated.

Figure 2:
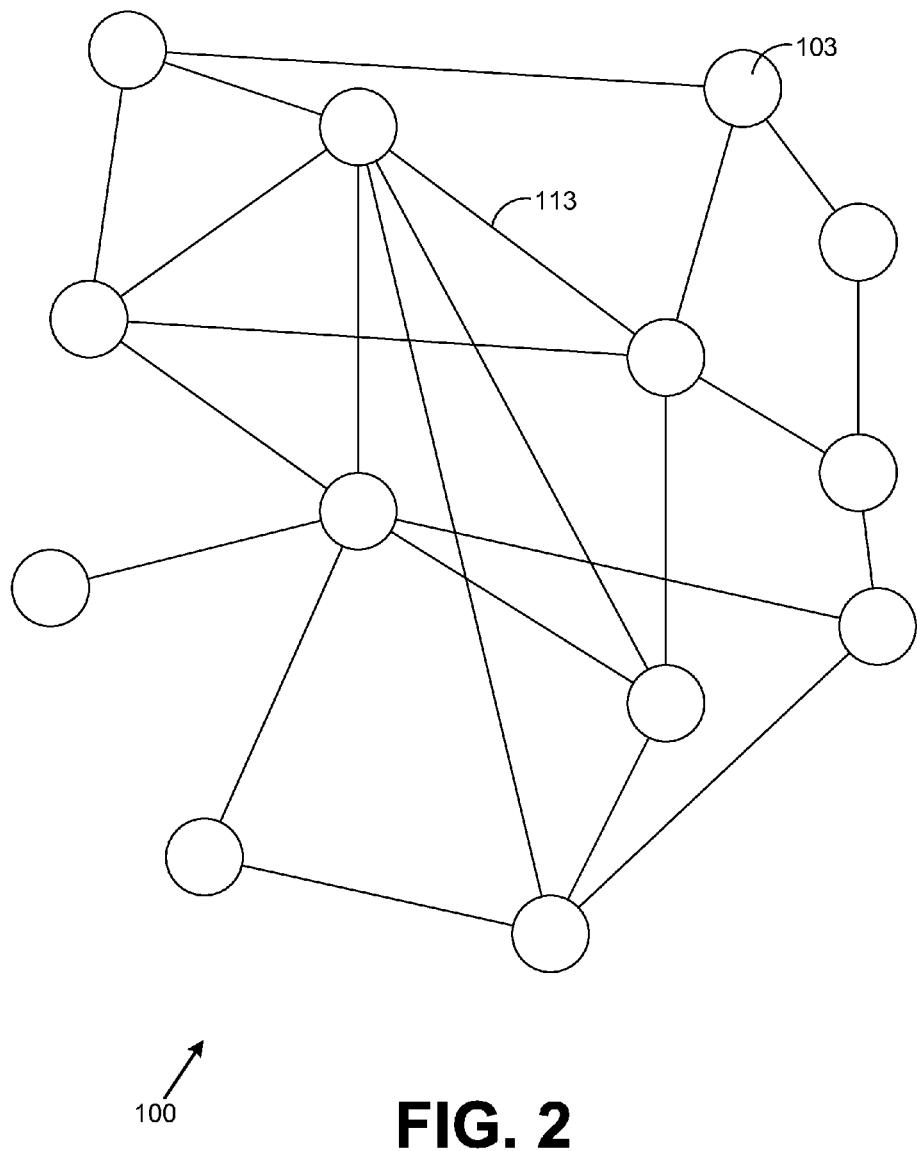
FIG. 2 is a drawing of communication pathways between nodes in the peer-to-peer network of FIG. 1 according to an embodiment of the present disclosure.

With reference next to FIG. 2, shown is an alternate view of the peer-to-peer network 100 that illustrates relationships 113 between the respective ones of the nodes 103. In particular, each circle represents a given one of the nodes 103 (FIG. 1). The lines between the nodes 103 represent relationships 113. Nodes 103 are related to each other when they "know" about each other in that they have identification information such as an address that they may use to send a message to a respective other node 103.

The configuration of relationships 113 with respect to a given node may be derived in any suitable fashion. For example, a user corresponding to a particular node 103 may explicitly specify the one or more peer nodes 103 to which the user wishes to be connected via the network 100. In this respect, the user may specify nodes 103 by using identifiers corresponding to the respective users of such nodes 103 such as user names, e-mail addresses, or other suitable identifiers. Alternatively, each of the nodes 103 may have a network address on the peer-to-peer network 100 as can be appreciated. In an additional alternative, a given node 103 may be configured to automatically identify potential peer nodes 103 on the basis of networks or relationships to which the user of a given node 103 belongs.

For example, each node 103 may be configured to implement functionality to identify peer nodes 103 based upon the user contacts as reflected in an e-mail application address book, contact manager, or other application contained within a node 103. Also, a user's membership in a social network (such as FACEBOOK™ or MYSPACE™), membership in a common organization (such as a common employer, school, or other organization), or any other suitable basis may be employed.

Also, establishing a relationship 113 between respective pairs of nodes 103 may be dependent upon obtaining consent of one or both of the users corresponding to the respective nodes 103. For example, each node 103 may implement an application that may be configured to present an interactive user interface such as a dialog box or other prompt through which a user may influence node behavior to provide such consent, etc. According to other embodiments, each node 103 may be configured to take automatic action to establish relationships 113 with other nodes 103 without requiring user approval.

Also, the peer nodes 103 may comprise so called "bots" or automated devices that are not actively controlled by users, but run autonomously. Such devices may discover each other and create relationships 113 with each other by various automated discovery tools or by automatically consulting directories and the like that may be accessible to the peer nodes 103. For example, peer nodes 103 may not correspond to users, but instead to software daemons, etc.

Each node 103 may accumulate a significant number of relationships 113 with other nodes over time as the node 103 is made aware of new peer nodes 103 with which it can establish a relationship. In this sense, the relationship 113 comprises the ability of two respective nodes 103 to have the requisite information about other nodes 103 so as to be able to communicate with each other.

The peer-to-peer network 100 can facilitate the proliferation of messages and content throughout the entire network by virtue of the relationships 113 between respective nodes 103. For example, assume that a given message generated by one of the nodes 103 is to be communicated to all of the other nodes 103 in the peer-to-peer network 100. A first node 103 may generate the message and send it to each of the peer nodes 103 with which the originating node 103 has a relationship 113. In this sense, the originating node 103 sends the message to those peer nodes 103 for which the originating node 103 has an appropriate network address or other identification information.

Thereafter, each of the recipients of the message forwards the message to those nodes with which the recipient has a relationship 113. This pattern occurs from node to node until each of the nodes 103 on the peer-to-peer network 100 has received the message. If the message finds its way back to a node 103 that has already received the message, then it may ignore the message, for example, given that such a node 103 will already have transmitted the same message to each of its peer nodes 103. In this sense, nothing is gained by forwarding a message further by such a node 103. Thus, according to the above principles, messages can proliferate among almost all of the nodes 103 within a given peer-to-peer network 100.

With the foregoing discussion in mind, with reference back to FIG. 1, the following is a discussion of the general operation of the one embodiment of the quorum sensing agents 109 denoted herein as quorum sensing agents 109a according to the various embodiment of the present invention. In one embodiment, each quorum sensing agent 109a maintains a tracking table in a memory associated with the peer node 103 in which the quorum sensing agent 109a is executed. Also, a peer identifier is associated with each of the peer nodes 103 in the peer-to-peer network 100. In one embodiment, the peer identifiers are globally unique peer identifiers. Each of the quorum sensing agents 109a is configured to generate a message that is transmitted to the peer nodes 103 of which it is aware. Such a message is then forwarded by those peers to additional peers, and so on. The message generated informs recipients of the existence on the peer-to-peer network 100 of the peer node 103 that originated the message. Alternatively, the message may indicate the existence of several peer nodes on the peer-to-peer network 100 as will be described.

The messages generated by a given peer node 103 propagate throughout the peer-to-peer network 100 as described above. Once a given one of the quorum sensing agents 109a within a peer node 103 receives a message from a second one of the peer nodes 103, the quorum sensing agent 109a processes the payload of the message to update its tracking table.

The tracking table in each peer node 103 includes a list of peer nodes 103 on the peer-to-peer network 100. Each peer node 103 is represented in the list using a corresponding peer identifier. Associated with each peer node 103 in the list are various property values. The property values comprise information about the respective peer node 103 that may be examined to determine whether a given peer node 103 is to be included when determining whether a quorum of peer nodes 103 is in existence on the peer-to-peer network 100 as will be described.

Each of the quorum sensing agents 109a is configured to generate and send a message to all of the peer nodes 103 of which it is aware. The quorum sensing agents 109a are configured to transmit the message either periodically, or upon an occurrence of a particular event. The message sent contains both the peer identifier and property values associated with the sending peer node 103. Alternatively, the message also include the peer identifiers and corresponding property values for a plurality of nodes 103 as stored in the tracking table of the sending node 103.

Upon receiving the message in a given peer node 103, the quorum sensing agent 109a determines whether the peer identifier already exists in its tracking table. If not, then the quorum sensing agent 109a will proceed to write the peer identifier and its associated property values indicated in the message in its tracking table.

Periodically, the quorum sensing agent 109a within a given peer node 103 examines the tracking table maintained therein to detect whether a quorum of peer identifiers exist in memory that each have property values that match a predefined criteria. In this sense, each of the peer nodes 103 makes a determination as to whether a number of other peer nodes 103 exist in the peer-to-peer network that have property values that match the predetermined criteria. For example, assume that a quorum of peer nodes 103 is set at a predefined number. If this number of peer identifiers are stored in the tracking table that have property values that match the predefined criteria, then it is known that a quorum of such peer nodes 103 is in existence on the peer-to-peer network 100.

Upon detecting a quorum, the quorum sensing agents 109a are configured to implement a predefined action. In this respect, the action may be any possible action that can be implemented by the peer node 103. For example, the action may comprise enabling appropriate functions, displays, or taking other actions. In one embodiment, the actions relate to coordinated action implemented by each of the peer nodes 103 that make up the quorum. In this respect, the individual peer nodes 103 that make up the quorum may communicate with each other, or may act independently to perform various tasks.

For example, in peer-to-peer gaming, it may be the case that a minimum number of players are required before a game can start. As such, the action taken by each peer when a quorum is sensed is to initiate the functionality associated with the game.

The action that is taken upon detection of a quorum may depend, for example, upon the application for which quorum detection is employed. For example, traffic control applications may use quorum sensing in vehicles that have processor capability that act as nodes 103. Such nodes 103 may be used to determine whether a predefined quorum or volume of traffic exists in a given geographical area indicating a potential future traffic jam. The vehicles could then take action upon detecting a quorum in a given area to select alternate routes, etc.

Also, the nodes 103 may include sensors that are configured to sense various physical conditions such as concentrations of chemicals, noise, or other conditions. For example, sensors may be used to detect pollution or radiation over a given area. Assuming that a quorum of sensors detect the condition, they may take action to send appropriate warnings and the like. For example, sensors that detect a quorum in a given area may emit a light, generate an audible alarm, or other warning indication. Such a light, audible alarm, or other warning indication would warn individuals to stay away from the area as indicated by the respective sensors.

In one embodiment, the property values associated with a respective peer node 103 indicated in each message may include a time stamp. This is done because respective peer nodes 103 may generate multiple messages where the property values are subject to change over time. When respective peer nodes 103 receive multiple messages from a given one of the peer nodes 103, the property values having the most recent time stamp is the one that is ultimately maintained in the tracking table within the respective peer node 103. Once a given peer node 103 has processed a message from another peer node 103, the quorum sensing agent 109a is configured to forward the message to one or more peer nodes 103 that are known to the respective peer node 103.

A given message originating in a given node 103 will be handed off from peer node 103 to peer node 103, being processed by each node 103 until the message expires. In this respect, a message may expire in that a time of expiration may be specified in the message that passes. Alternatively, a message may also include a number indicating the total degrees of separation from the originating node 103 are allowable. The number of degrees of separation indicates the number of times the message may be passed from one node 103 to another. Once the maximum specified number of degrees of separation has been reached, then the message expires. As the message is passed from node 103 to node 103, the quorum sensing agent 109 is configured to increment the number of degrees of separation that have occurred in the message to keep track of whether the message has expired. Alternatively, some other approach may be used to determine whether a message has expired.

The property values comprise information about a respective peer node 103. In this respect, a property values may include a "type" identification, a time stamp indicating time of creation as set mentioned above, a geographical location information, or other information. The geographical location information may comprise, for example, coordinates that are generated based upon a global positioning system as can be appreciated. It should be noted that it may be the case that the one or more property values associated with a respective peer node 103 that are included in a given message are used for other purposes besides detecting a quorum.

As mentioned above, in one embodiment, the quorum sensing agent 109 is configured to examine the tracking table to determine whether a quorum of peer nodes 103 exists based on those listed. To this end, a given peer node 103 examines each of the peer identifiers and their associated property values in their tracking tables to determine whether such peer nodes 103 are to be counted toward the existence of a quorum. To determine whether a peer node 103 is to be counted, as stated above, the quorum sensing agents 109a compare the respective property values with predefined criteria.

According to various embodiments, the predefined criteria may include any information relevant to the respective peer nodes 103. In this respect, the predefined criteria may comprise, for example, a time period within which a time stamp associated with the property values must fall, or predefined criteria may require a given type identification. Additionally, the predefined criteria may require that a respective property value specify a geographical position that is within a predefined distance from a predefined geographical point. Such criteria specifies that peer nodes 103 be located within a given area as can be appreciated.

The above identified criteria and various types of property values allow for the detection of quorums of the peer nodes 103 based upon a given type, a relevancy in time, a position of the respective peer nodes 103 relative to a given point, or other criteria as can be appreciated. Alternatively, quorums of peer nodes 103 may be detected based upon a combination of different various property values. For example, a given peer node 103 may attempt to find a quorum in its tracking table of peer nodes 103 that are of a given type that are positioned within a given geographical area within a predefined a predefined period of time. There is no limit to the different types of ways the quorums may be detected based upon the property values associated with peer nodes 103 as contemplated herein.

The time stamp included in the property values in the messages transmitted by the peer nodes 103 may be employed to update or overwrite previous property values stored in the tracking tables of other peer nodes 103 so that the most recent version of the property values associated with respective one of the peer nodes 103 are stored in the tracking table. For example, assume that a given peer node 103 receives a message from another peer node 103 and writes the peer identifier and the property values contained therein in its tracking table. As such, the recipient peer node 103 has a first version of the property values from the sending peer node 103. Assume that the sending peer node 103 then transmits a second message with the same peer identifier and updated property values. For example, if the property values include a geographical position, then assume the geographical position of the sending peer node 103 has changed over time.

When the receiving peer node 103 receives the second message including the peer identifier as well as the updated property values, the quorum sensing agent 109a in the receiving peer node 103 will write the new property values from the second message over the previous property values recorded in the tracking table of the receiving peer node 103. This is because presumably the time stamp associated with the updated property values is later than the time stamp associated with the previously stored property values.

In this manner, by transmitting messages onto the peer-to-peer network 100 periodically, a given peer node 103 may inform the other peer nodes 103 of changes in its property values. Given that a time stamp is associated with the property values in a given message, if a peer node 103 receives a message with property values from another peer node 103 that has an earlier time stamp than the property values currently stored in the tracking table of the receiving peer node 103, then such received property values are ignored as being outdated. As such, they are not written to the tracking table in association with the peer identifier associated with the sending peer node 103. This reflects that old and new messages generated by a given peer node 103 may be circulating in the peer-to-peer network 100 at the same time.

Given that property values associated with a given peer identifier in a given tracking table of a peer node 103 may change over time, it is possible for quorums of peer nodes 103 to be established, lost, and reestablished time and again over a period of time.

In addition, a given message from a sending one of the peer nodes 103 may indicate that the respective peer node 103 is to be eliminated from consideration for any quorum. Upon receiving such a message, a given one of the peer nodes 103 will remove the peer indication and corresponding property values from its tracking table so that the peer node 103 associated therewith is not considered in the determination of the existence of any quorums from that point forward. A peer node 103 may send a message so as to eliminate itself from consideration for the determination of the existence of quorums due to the fact that it is in the process of powering down, for example, or for some other reason.

A message may include a plurality of peer identifiers that are listed in association with a corresponding plurality of property value for each respective peer identifier. In this respect, each peer node 103 may transmit its own peer identifier and associated property values along with the peer identifiers and property values stored within its tracking table in a given message. In this manner, each peer node 103 that receives the message may reconcile the entries in its tracking table with the multiple entries in the message received in a manner similar to that described above.

Figure 3:
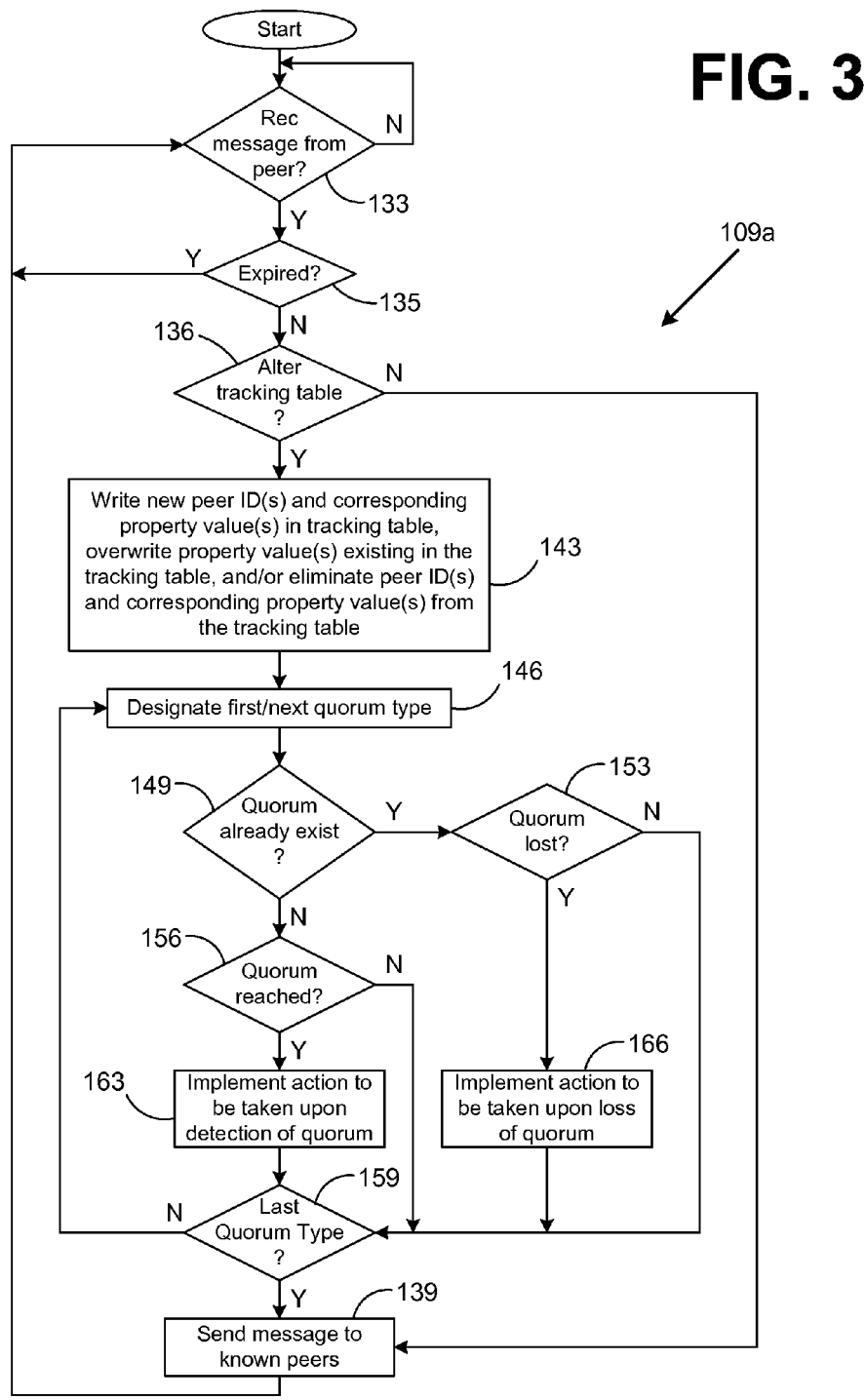
FIG. 3 is a flow chart that illustrates an example of the operation of one embodiment of a quorum sensing agent executed on a peer in the peer-to-peer network of FIG. 1 according to an embodiment of the present disclosure.

With the foregoing in mind, reference is made next to FIG. 3 that shows a flowchart that provides one example of the operation of the quorum sensing agent 109a in processing a message received from a peer node 103 according to various embodiments of the present invention. Alternatively, the flowchart of FIG. 3 may be viewed as depicting steps of a method implemented in the respective peer nodes 103.

Beginning with box 133, the quorum sensing agent 109a waits to receive a message from a respective peer node 103. Assuming that such a message is received in box 133, then the quorum sensing agent 109a proceeds to box 135. In box 135, the quorum sensing agent 109a determines whether the message has expired as described above. If so, then the message is deleted and the quorum sensing agent 109a reverts back to box 133 to wait to receive the next message. If the message is not expired in box 135, then the quorum sensing agent 109a proceeds to box 136.

In box 136, the content of a message is checked to determine whether the peer identifier associated with the sending node 103 and the associated property values included in the message need to be added to or updated in the tracking table of the current peer node 103. For example, if the peer indicator and property values in the message are already written to the tracking table of the current peer node 103 and the property values are the same as those already stored, then the quorum sensing agent 109a need not take any action to update the tracking table in view of the information contained in the message. As such, the quorum sensing agent will proceed to box 139. On the other hand, if there is something new in the message that needs to be updated in the tracking table, then the quorum sensing agent 109a proceeds to box 143.

In box 143, the quorum sensing agent 109a proceeds to write the new peer identifier(s) and corresponding property value(s) from the message in the tracking table associated with the respective peer node 103. Also, any peer identifier(s)/property value(s) in the message that already exists in the tracking table are updated or overwritten if the new property value(s) in the message have a time stamp that is later than the time stamp of the property value(s) currently stored in the tracking table. Also, a peer identifier(s) and corresponding property value(s) may be eliminated from the tracking table if so directed by the content of the message. Once the quorum sensing agent 109a has processed all of the information in the received message, then the quorum sensing agent 109a proceeds to box 146.

In box 146, quorum sensing agent 109a establishes a loop for the examination of the tracking table to determine whether one or more quorums of peer nodes 103 exist. In this respect, the quorum sensing agent 109a designates a first quorum type as identified by the predefined criteria for the respective quorum type. In this respect, there may be several different sets of criteria, each one specifying the requirements for a given node 103 to belong to a respective quorum.

Next, in box 147, the quorum sensing agent 109a determines whether the quorum type has already been detected in the past. If so, then the quorum sensing agent 109a proceeds to box 153. Otherwise, the quorum sensing agent 109a progresses to box 156. This determination is made as there is no need to detect a quorum if the quorum already exists.

In box 156, the quorum sensing agent 109a determines whether a quorum exists for the respective quorum type designated in box 146. This is done by examining the property values associated with respective peer identifiers in the tracking table to see if a predefined number of peer nodes 103 associated therewith have property values that matches the criteria for the respective quorum type. If no quorum exists, then the quorum sensing agent 109a proceeds to box 159. Otherwise, the quorum sensing agent 109a progresses to box 163.

In box 163, the quorum sensing agent 109a implements an action based upon the detection of the existence of a quorum in box 156. In this respect, the action may be any one of the various actions described above. The actions taken by multiple peer nodes 103 in the quorum may be independent of each other, or may be interdependent upon one another. Thereafter, the quorum sensing agent 109a progresses to box 159.

Referring back to box 153, if the quorum is determined to have already existed for the given quorum type in box 149, then the quorum sensing agent 109a determines whether a quorum has been lost in box 153. This may be the case, for example, where property values have changed over time such that the peer identifier and associated property values for a respective peer node 103 no longer match the predefined criteria for a respective quorum type. In such case, the one or more peer nodes 103 are removed from the quorum, thereby resulting in a loss of the quorum. If in box 153 the quorum is lost, then the quorum sensing agent 109a proceeds to box 166. Otherwise, the quorum sensing agent 109a progresses to box 159.

In box 166, the quorum sensing agent 109a takes such action as is deemed necessary based upon the loss of the quorum. Such action may be, for example, reverting back to a mode of operation in the peer node 103 that existed before the quorum was detected in the first place. Alternatively, other types of actions may be taken in the peer node 103 as mentioned above. Thereafter, the quorum sensing agent 109a proceeds to box 159.

In box 159, the quorum sensing agent 109a determines whether the last quorum type has been considered in the tracking table to detect the existence of a new quorum or detect the loss of a quorum, as described above. If the last quorum type has not been processed, then the quorum sensing agent 109a reverts back to box 146 to designate the next quorum type for consideration. Otherwise, the quorum sensing agent 109a progresses to box 139.

In box 139, the quorum sensing agent 109a proceeds to forward the message originally received to the known peers of the current peer node 103. Thereafter, quorum sensing agent 109a reverts back to box 133 to await the receipt of the next message from a respective one of the peer nodes 103. By virtue of the operation of the sending function of box 139, a respective message continues to propagate through the peer-to-peer network 100 as described above.

Alternatively, the quorum sensing agent 109a may not forward the message if it was already seen. Specifically, if a message is received having a peer identifier and associated property value(s) that are already recorded in the tracking table, then it can be assumed that a prior message had been received that included the same peer identifier and property value(s). As such, nothing is gained by forwarding the message to known peer nodes 103 and the quorum sensing agent 109a may delete the message. The discussion of timestamps above is also relevant to the extent that a comparison of a timestamp in a message with a timestamp in a tracking table is performed to see if the data in the message is new relative to the data relating to one or more peer nodes 103 in the tracking table.

With reference back to FIG. 1, according to another embodiment of the quorum sensing agent 109 denoted herein as a quorum sensing agent 109b, quorum sensing in the peer-to-peer network 100 may be accomplished by the use of a quorum sensing token. In particular, each of the quorum sensing agents 109b within the respective peer nodes 103 is configured to generate a quorum sensing token and transmit the quorum sensing token to the peer nodes 103 of which it is aware. The generation and transmitting of a quorum sensing token may occur periodically, upon an occurrence of a predefined event, or at some other time.

In generating the quorum sensing token, a respective one of the peer nodes 103 may include properties within the quorum sensing token, a token count, a value required to establish a quorum, and space for respective peer nodes 103 to include a marker as will be described. The properties in the token may comprise an expiration indication such as an expiration time. Alternatively, the expiration indication may comprise a maximum degrees of separation that are allowed for the respective quorum sensing token to propagate through the peer-to-peer network 100 and a corresponding degree of separation count. The initial value of the degree of separation count is set at zero as can be appreciated. The significance of the information included in a quorum sensing token will be described hereafter.

Once a quorum sensing token has been created, it is transmitted to respective peer nodes 103 in the peer-to-peer network 100. When a given peer node 103 first receives a quorum sensing token, the quorum sensing agent 109b in the peer node 103 determines whether the quorum sensing token is expired. If so, then it is deleted. If the token is not expired, then the quorum sensing agent 109b determines whether the properties associated with the respective peer node 103 match or otherwise qualify as equivalent to the properties of the quorum sensing token. If so, then the quorum sensing agent 109b will increment the token count maintained in the quorum sensing token.

Thereafter, the given peer node 103 generates a marker unique to the peer node 103 with respect to the other peer nodes 103 and includes the marker in the appropriate location in the quorum sensing token. This is done so that if the respective peer node 103 receives the same quorum sensing token again, it will know that it has already incremented the token count for such token and will delete the token as it was already transmitted to the peer nodes 103 of which it is aware. Alternatively, the respective peer node 103 may merely pass the token through to the peer nodes 103 of which the respective peer node 103 is aware or delete the quorum sensing token if it is expired.

In addition, each time a quorum sensing token that has not expired is received by a respective peer node 103, regardless of whether the respective peer node 103 increments the token count, the peer node 103 determines if a quorum of peers exists based upon whether the token count reaches the value needed for a quorum indicated in the quorum sensing token. Alternatively, a value needed for a quorum may be maintained in the individual peer nodes 103. If the token count has reached the quorum, a quorum of peers is then deemed to exist.

In such case, the respective peer node 103 implements a predefined action in response to the detection of the quorum. That is to say, when each peer node 103 independently detects a quorum due to the proliferation of the tokens 103 throughout the peer-to-peer network 100, each peer node 103 may implement a predefined action that is independent of the actions implemented by other peer nodes 103 that have also detected the quorum. Alternatively, the actions implemented by the respective peer nodes 103 may be performed in concert with each other peer nodes 103, where the action taken by each peer node 103 involves cooperation among the peer nodes 103. For example, as to cooperation, peer nodes 103 in a quorum may work to assign various tasks to respective ones of the nodes 103 in the quorum. To this end, peer nodes 103 may negotiate among one another to foster such cooperation when they have individually detected the existence of a quorum.

In one example, action that is taken in concert may involve, for example, cooperation among players in a virtual game implemented on the peer nodes 103. Also, in a traffic control example, vehicles could cooperate to relieve congestion.

Figure 4:
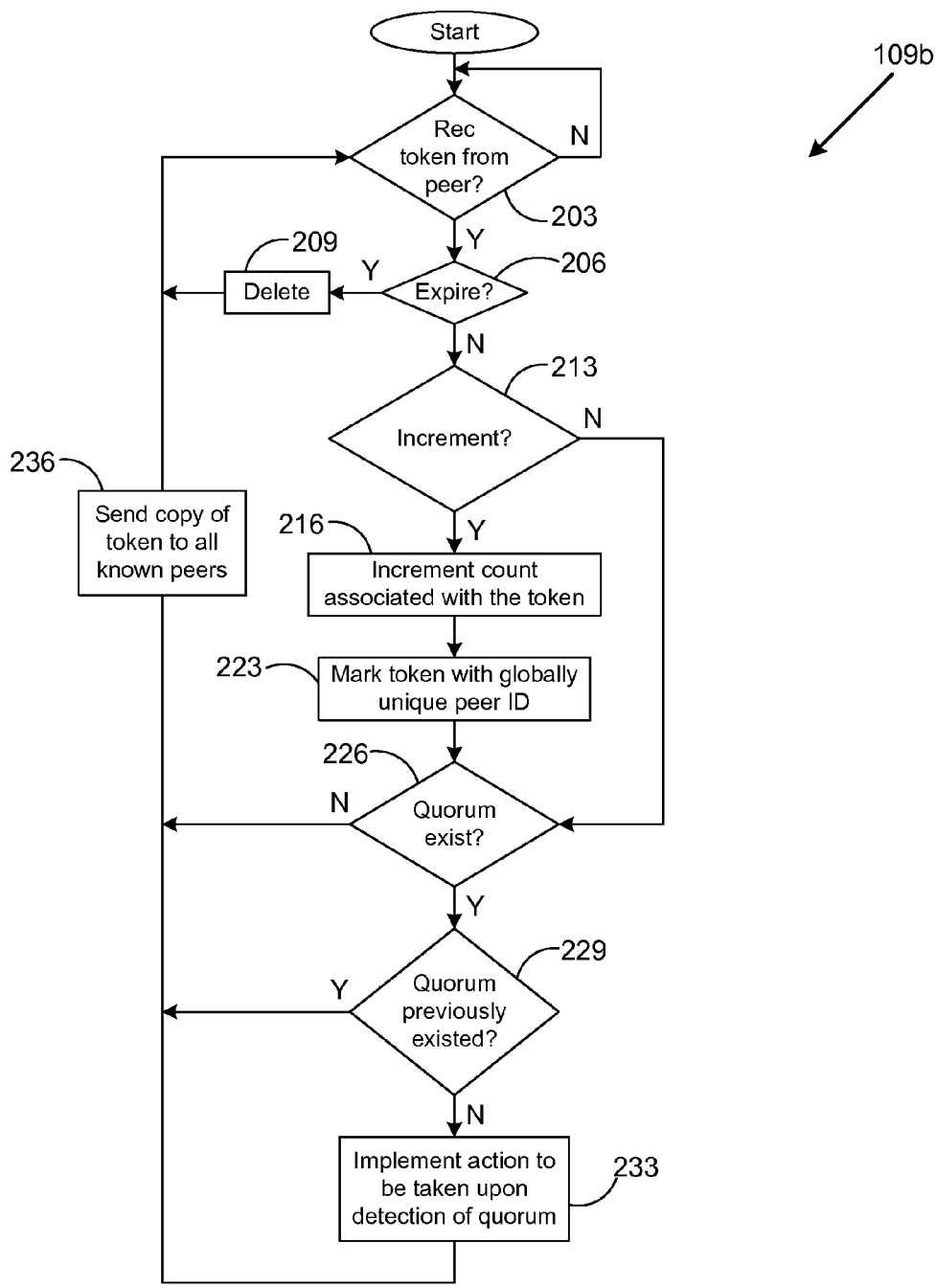
FIG. 4 is a flow chart that illustrates another example of the operation of a second embodiment of a quorum sensing agent executed on a peer in the peer-to-peer network of FIG. 1 according to an embodiment of the present disclosure.

With reference next to FIG. 4, shown is a flowchart that provides one example of the operation of the quorum sensing agent 109b in processing a quorum sensing token that travels through the various peer nodes 103 in the peer-to-peer network 100 (FIG. 1) according to various embodiments. Alternatively, the flowchart of FIG. 4 may be viewed as depicting steps of a method implemented in respective ones of the peer nodes 103 in processing and forwarding the quorum sensing tokens.

Beginning with box 203, the quorum sensing agent 109b waits to receive a quorum sensing token from a respective one of the peer nodes 103 in the peer-to-peer network 100. Upon receiving a quorum sensing token, the quorum sensing agent 109b proceeds to box 206 in which the quorum sensing agent 109b determines whether the quorum sensing token received has expired. This may occur, for example, where a time set for expiration has passed, where the degrees of separation of the quorum sensing token has reached its limit, or in some other manner. If the quorum sensing agent 109b determines that the quorum sensing token has expired, then the quorum sensing agent 109b proceeds to box 209. Otherwise, the quorum sensing agent 109b progresses to box 213.

In box 209, the quorum sensing agent 109b deletes the quorum sensing token and does not proceed to forward the quorum sensing token to any one of the peer nodes 103 of which it is aware. This is because the quorum sensing token has run its course and has expired and should be removed from the peer-to-peer network 100. If it were not for the expiration of quorum sensing tokens, then they would propagate without end, thereby resulting in undesirable use of bandwidth of the peer-to-peer network 100 and potentially create other problems. Once the quorum sensing token has been deleted in box 209, then the quorum sensing agent 109b reverts back to box 203 to await the arrival of the next quorum sensing token.

Assuming that the quorum sensing agent 109b has progressed to box 213, the quorum sensing agent 109b determines whether it should increment the token count in the quorum sensing token. This is determined by first ensuring that the property values associated with the respective peer node 103 match or otherwise qualify as equal to the properties specified in the quorum sensing token. Also, the quorum sensing agent 109b should not have already incremented this particular quorum sensing token. This may be determined by examining whether the quorum sensing agent 109b had previously marked the quorum sensing token with its peer identifier.

Assuming that the quorum sensing agent 109b determines that it is to increment the token count, then the quorum sensing agent 109b progresses to box 216. Otherwise, the quorum sensing agent 109b jumps to box 226. In box 216, the quorum sensing agent 109b increments the token count of the quorum sensing token. Thereafter, the quorum sensing token progresses to box 223 in which the quorum sensing agent 109b marks the quorum sensing token by including a unique peer identifier associated with the respective peer node 103. Thereafter, the quorum sensing agent 109b moves to box 226.

In box 226, the quorum sensing agent 109b determines whether a quorum exists. This may be determined, for example, by comparing the token count with the value indicated in the quorum sensing token as being needed for a quorum of peers. If the token count is greater than or equal to the quorum indicated in the quorum sensing token, then the quorum sensing agent 109b may deem that a quorum of peers exists in the peer-to-peer network 100. Thereafter, the quorum sensing agent 109b progresses to box 229.

In box 229, the quorum sensing agent 109b determines whether a quorum was previously detected based upon a different quorum sensing token received earlier. As such, the quorum sensing agent 109b need not take any action in view of detecting the quorum a second time. If in box 229 there was no previous quorum detected, then the quorum sensing agent 109b progresses to box 233 to implement action that is to be taken upon detection of a quorum. Such action is similar to that described above with previous embodiments. Thereafter, the quorum sensing agent 109b progresses to box 236.

If the quorum sensing agent 109b detects that no quorum exists in box 226, or that a quorum previously existed in box 229, then the quorum sensing agent 109b progresses from both locations to box 236 in which a copy of the quorum sensing token is sent to all peer nodes 103 that are known to the respective peer node 103 processing the quorum sensing token. Thereafter, the quorum sensing agent 109b reverts back to box 203 to await the receipt of a new quorum sensing token to process.

Figure 5:
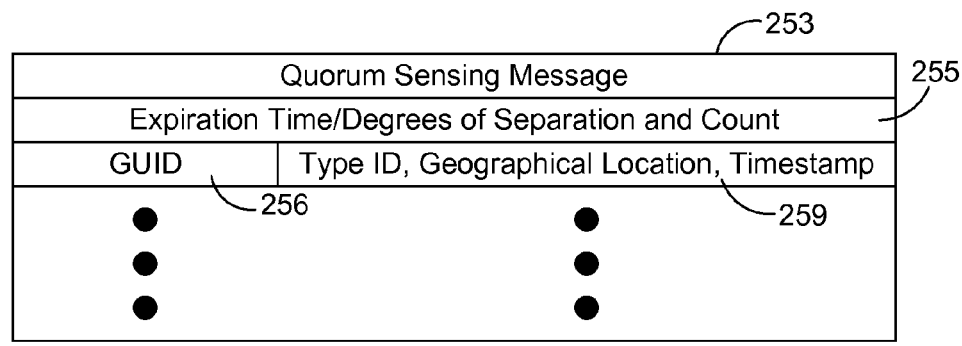
FIG. 5 is a drawing of a quorum sensing message employed by the quorum sensing agent of FIG. 3 according to an embodiment of the present disclosure.

With reference next to FIG. 5, shown is one example of a quorum sensing message generated by a respective one of the quorum sensing agents 109a as described above. As set forth above, the quorum sensing message 253 includes one or more peer identifiers that are associated with respective ones of the peer nodes 103. According to one embodiment, the peer identifiers may be globally unique identifiers to ensure the uniqueness of every single peer node 103 identified.

The quorum sensing message 253 further includes property values 259 that may comprise such information as a type identification, a geographical location, a time stamp, or other information as described above. The property values 259 may also include an indication of expiration which may be a time, specified degrees of separation (with a count), or other information from which expiration of the quorums sensing message may be determined. In addition, quorum sensing message 253 may include multiple pairs of the peer identifiers 256 and property values 259 as shown.

Figure 6:
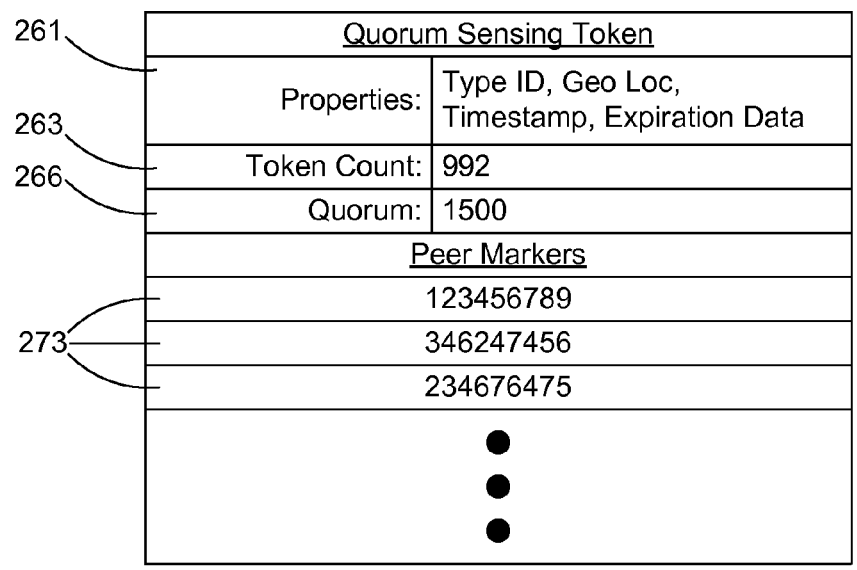
FIG. 6 is a drawing of a quorum sensing token processed by the quorum sensing agent of FIG. 4 according to an embodiment of the present disclosure.

With reference next to FIG. 6, shown is one example of a quorum sensing token as is passed from peer node 103 to peer node 103 in the peer-to-peer network 100 as described above. The quorum sensing token includes the properties 261 and the token count 263. The quorum sensing token further includes a quorum 266 which is a value indicative of the number of peers needed to create a quorum.

The properties 261 may include such information as a type identification, a geographical location, a time stamp, or other information as described above. Also, the properties 261 may comprise an expiration indication such as, for example, a date/time, a number of degrees of separation, or other indication. In addition, the quorum sensing token may include a degree of separation count that increments each time the quorum sensing token is passed from a given peer node 103 to another peer node 103 to determine when the total number of degrees of separation has occurred, thereby causing expiration of the quorum sensing token. Also, the quorum sensing token includes a plurality of peer markers 273 associated with respective ones of the peer nodes 103 that have processed the quorum sensing token.

Figure 7:
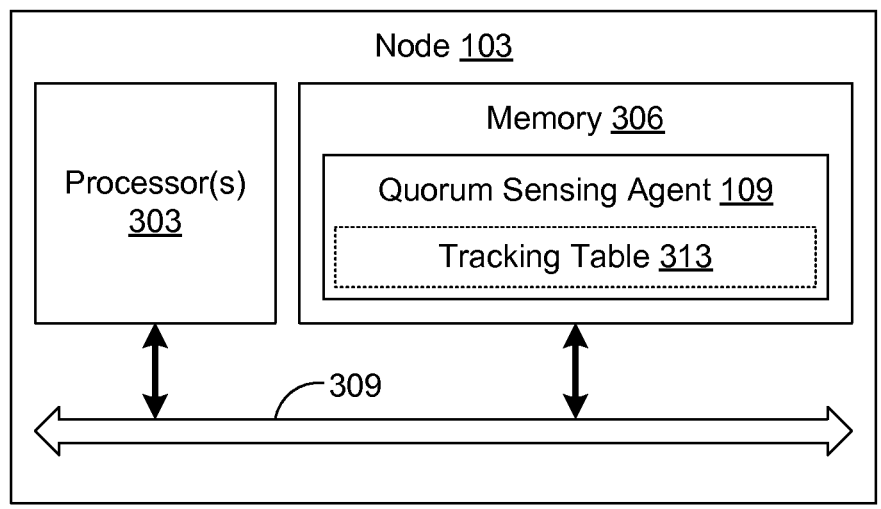
FIG. 7 is a block diagram of one example embodiment of a node in the peer-to-peer network of FIG. 1 according to an embodiment of the present disclosure.

With reference to FIG. 7, shown is one example of a peer node 103 according to an embodiment of the present disclosure. The peer node 103 may include one or more processor circuits having a processor 303 and a memory 306, both of which are coupled to a local interface 309. In this respect, the local interface 309 may comprise, for example, a data bus with an accompanying control/address bus as can be appreciated. The peer node 103 may comprise, for example, a computer system, personal digital assistant, or other system as can be appreciated.

Stored on the memory 306 and executable by the processor 303 are various components such as an operating system (not shown) and a quorum sensing agent 109. In the case that the quorum sensing agent 109 comprises the quorum sensing agent 109a, the tracking table 313 is stored in the memory 306. In addition, it is understood that many other components may be stored in the memory 306 and executable by the processor 303.

As set forth above, with reference to FIG. 7, a number of components may be stored in the memory 306 are executable by the processor 303. In this respect, the term "executable" refers to a program file that is in a form that can ultimately be run by the processor 303. Examples of executable programs may be, for example, a compiled program that can be translated into machine code in a format that can be loaded into a random access portion of the memory 306 and run by the processor 303. Executable programs may also be source code that may be expressed in proper format such as object code that is capable of being loaded into a random access portion of the memory 306 and executed by the processor 303. An executable program may be stored in any portion or component of the memory 306 including, for example, random access memory, read-only memory, a hard drive, compact disk (CD), floppy disk, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network that facilitates communication between any two of the multiple processors, between any processor and any of the memories, or between any two of the memories, etc. The processor 303 may be of electrical or optical construction, or of some other construction as can be appreciated by those with ordinary skill in the art.

Although various functionality of the quorum sensing agent 109 is described as being embodied in software or code executed by general purpose hardware as set forth above, as an alternative the same may also be embodied in dedicated hardware or a combination of software/general purpose hardware and dedicated hardware. If embodied in dedicated hardware, the functionality of the quorum sensing agent 109 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and/or the flow charts of FIGS. 3-7 show the architecture, functionality, and operation of an example of the quorum sensing agent 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 3 and 4 show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the quorum sensing agent 109 is expressed in the form of software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the quorum sensing agent 109 for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are possible examples of implementations, merely set forth for a clear understanding of the principles of the disclosure. Many variations and modifications may be made to the above-described embodiment(s) of the disclosure without departing substantially from the spirit and principles of the present disclosure. All such modifications and variations are intended to be included herein within the scope of this disclosure and protected by the following claims.

Therefore, at least the following is claimed:

1. A non-transitory computer-readable medium embodying a program executable in a computing device, the computing device corresponding to a first peer of a plurality of peers participating in a peer-to-peer network, wherein, when executed, the program causes the computing device to at least:
receive, from a second peer of the plurality of peers, a quorum sensing token having a token count;
detect that a quorum of the plurality of peers exists based at least in part on the token count in the quorum sensing token; and
implement a predefined action in the first peer in response to detecting the quorum of the plurality of peers.

2. The non-transitory computer-readable medium of claim 1, wherein, when executed, the program further causes the computing device to at least forward the quorum sensing token to a third peer of the plurality of peers.

3. The non-transitory computer-readable medium of claim 1, wherein, when executed, the program further causes the computing device to at least:
determine that the quorum sensing token is new to the first peer based at least in part on the first peer having a peer property corresponding to a property expressed in the quorum sensing token; and
increment the token count.

4. The non-transitory computer-readable medium of claim 1, wherein, when executed, the program further causes the computing device to at least:
determine that the quorum sensing token is new to the first peer; and
mark the quorum sensing token with a peer identifier associated with the first peer.

5. A system comprising:
a data store storing quorum detection data; and
a computing device corresponding to a first peer of a plurality of peers on a peer-to-peer network, the computing device in communication with the data store and configured to at least:
receive a message originating from a second peer of the plurality of peers, the message including a peer identifier;
determine that the peer identifier is not stored with the quorum detection data in the data store;
store the peer identifier with the quorum detection data in the data store; and
detect that a quorum of the plurality of peers are present on the peer-to-peer network based at least in part on the quorum detection data in the data store.

6. The system of claim 5, wherein the computing device is further configured to at least forward the message to a third peer of the plurality of peers that is known to the first peer.

7. The system of claim 5, wherein the computing device is further configured to at least:
receive a subsequent message that includes the peer identifier in association with a corresponding indication that the peer identifier is to be eliminated from consideration as to determining that the quorum of the plurality of peers are present on the peer-to-peer network; and
remove the peer identifier from the quorum detection data in the data store in response to the subsequent message.

8. The system of claim 5, wherein the computing device is further configured to at least implement a predefined action in response to detecting the quorum.

9. The system of claim 5, wherein the message further includes a corresponding property value listed in association with the peer identifier.

10. The system of claim 9, wherein the computing device is further configured to at least store the corresponding property value in association with the peer identifier in the quorum detection data.

11. The system of claim 10, wherein the corresponding property value comprises a first property value, and the computing device is further configured to at least:
receive a subsequent message including the peer identifier listed in association with a corresponding second property value; and
overwrite the first property value with the corresponding second property value.

12. The system of claim 10, wherein detecting that the quorum of the plurality of peers is present further comprises detecting that a threshold quantity of corresponding property values stored in the quorum detection data satisfy a predefined criterion.

13. The system of claim 12, wherein the predefined criterion requires that the corresponding property value includes a timestamp that falls within a predefined period of time.

14. The system of claim 12, wherein the predefined criterion requires that the corresponding property value specify a geographic position that is within a predefined distance from a predefined geographic position.

15. A computer-implemented method comprising:
receiving, by a computing device corresponding to a first peer of a plurality of peers participating in a peer-to-peer network, a quorum sensing token from a second peer of the plurality of peers, the quorum sensing token having a token count;
detecting, by the computing device, that a quorum of the plurality of peers exists based at least in part on the token count in the quorum sensing token; and
implementing, by the computing device, a predefined action in response to detecting the quorum of the plurality of peers.

16. The computer-implemented method of claim 15, further comprising forwarding, by the computing device, the quorum sensing token to a third peer of the plurality of peers.

17. The computer-implemented method of claim 15, further comprising,
determining, by the computing device, that the quorum sensing token is new to the first peer based at least in part on the first peer having a peer property corresponding to a property expressed in the quorum sensing token; and incrementing, by the computing device, the token count.

18. The computer-implemented method of claim 17, where the property further comprises at least one of: a type identification, a timestamp indicating a time of creation, or a geographic location identification.

19. The computer-implemented method of claim 15, further comprising:

determining, by the first computing device, that the quorum sensing token is new to the first peer; and marking, by the computing device, the quorum sensing token with a peer identifier associated with the first peer.

20. The computer-implemented method of claim 15, further comprising determining, by the computing device, that the quorum sensing token has not expired.

* * * * *